United States Patent
Bhatti

(12) 
(10) Patent No.: US 7,215,932 B2
(45) Date of Patent: *May 8, 2007

(54) ON-CHIP IMPEDANCE MATCHING POWER AMPLIFIER

(75) Inventor: Iqbal S. Bhatti, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/120,763

(22) Filed: May 3, 2005

(65) Prior Publication Data

US 2005/0191977 A1    Sep. 1, 2005

Related U.S. Application Data

(63) Continuation of application No. 10/122,458, filed on Apr. 15, 2002, now Pat. No. 6,907,231.

(51) Int. Cl.
*H04Q 11/12* (2006.01)
*H04B 1/04* (2006.01)

(52) U.S. Cl. .................... 455/127.1; 455/121

(58) Field of Classification Search ............. 455/127.1, 455/121, 129, 91, 95, 107, 120; 333/32
See application file for complete search history.

(56) References Cited

U.S. PATENT DOCUMENTS

| | | | | |
|---|---|---|---|---|
| 4,554,678 A | * | 11/1985 | Bowman | ............... 455/286 |
| 5,451,914 A | * | 9/1995 | Stengel | .................. 333/25 |
| 6,633,005 B2 | * | 10/2003 | Ichitsubo et al. | ......... 174/260 |
| 6,724,263 B2 | * | 4/2004 | Sugiura | ................. 330/302 |
| 6,731,712 B1 | * | 5/2004 | Lindstrom et al. | ......... 375/376 |
| 6,907,231 B2 | * | 6/2005 | Bhatti | ..................... 455/127.1 |
| 2002/0177417 A1 | * | 11/2002 | Visser | ........................ 455/83 |

* cited by examiner

*Primary Examiner*—Nguyen T. Vo
(74) *Attorney, Agent, or Firm*—Garlick Harrison & Markison; Timothy W. Markison; Bruce E. Stuckman

(57) ABSTRACT

An on-chip impedance matching includes a transistor and a tank circuit. The transistor is operably coupled to receive an input signal. The tank circuit is operably coupled to the transistor, wherein a tap of the tank circuit provides an output of the on-chip impedance matching power amplifier, wherein the tank circuit is tuned with respect to an antenna load of the on-chip impedance matching power amplifier.

6 Claims, 4 Drawing Sheets power amplifier 84 power amplifier 84 power amplifier 84 power amplifier 84

ON-CHIP IMPEDANCE MATCHING POWER AMPLIFIER

This patent application is claiming priority under 35 USC § 120 as a continuing patent application of patent application entitled ON-CHIP IMPEDANCE MATCHING POWER AMPLIFIER AND RADIO APPLICATOINS THEREOF, having a filing date of Apr. 15, 2002 and a Ser. No. 10/122,458 now U.S. Pat. No. 6,907,231.

TECHNICAL FIELD OF THE INVENTION

This invention relates generally to communication systems and more particularly to power amplification and impedance matching within such communication systems.

BACKGROUND OF THE INVENTION

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver receives RF signals, removes the RF carrier frequency from the RF signals via one or more intermediate frequency (IF) stages to produce analog baseband signals, converts the analog low IF signals into digital low IF signals, and demodulates the digital baseband signals in accordance with a particular wireless communication standard to recapture the transmitted data.

As is also known, the transmitter modulates data in accordance with a particular wireless communication standard to produce digital baseband signals. The transmitter converts the digital baseband signals into analog baseband signals, which are mixed with one or more local oscillations to produce RF signals. The RF signals are amplified by a power amplifier and filtered prior to transmission via an antenna. To ensure proper antenna coupling, an impedance matching circuit is positioned in series between the power amplifier and the antenna. Because the impedance matching circuit is positioned in series, its losses directly impact the efficiency of the transmitter.

To minimize the losses of impedance matching circuits, off-chip components are used instead of lossier on-chip components. However, the use of off-chip components is in direct contrast with current wireless communication demands for greater component integration to improve performance, reduce size, reduce power consumption, and reduce costs.

Therefore, a need exists for a relatively lossless power amplifier and impedance matching circuit implementation for radio frequency integrated circuits.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF A PREFERRED EMBODIMENT

Figure 1:
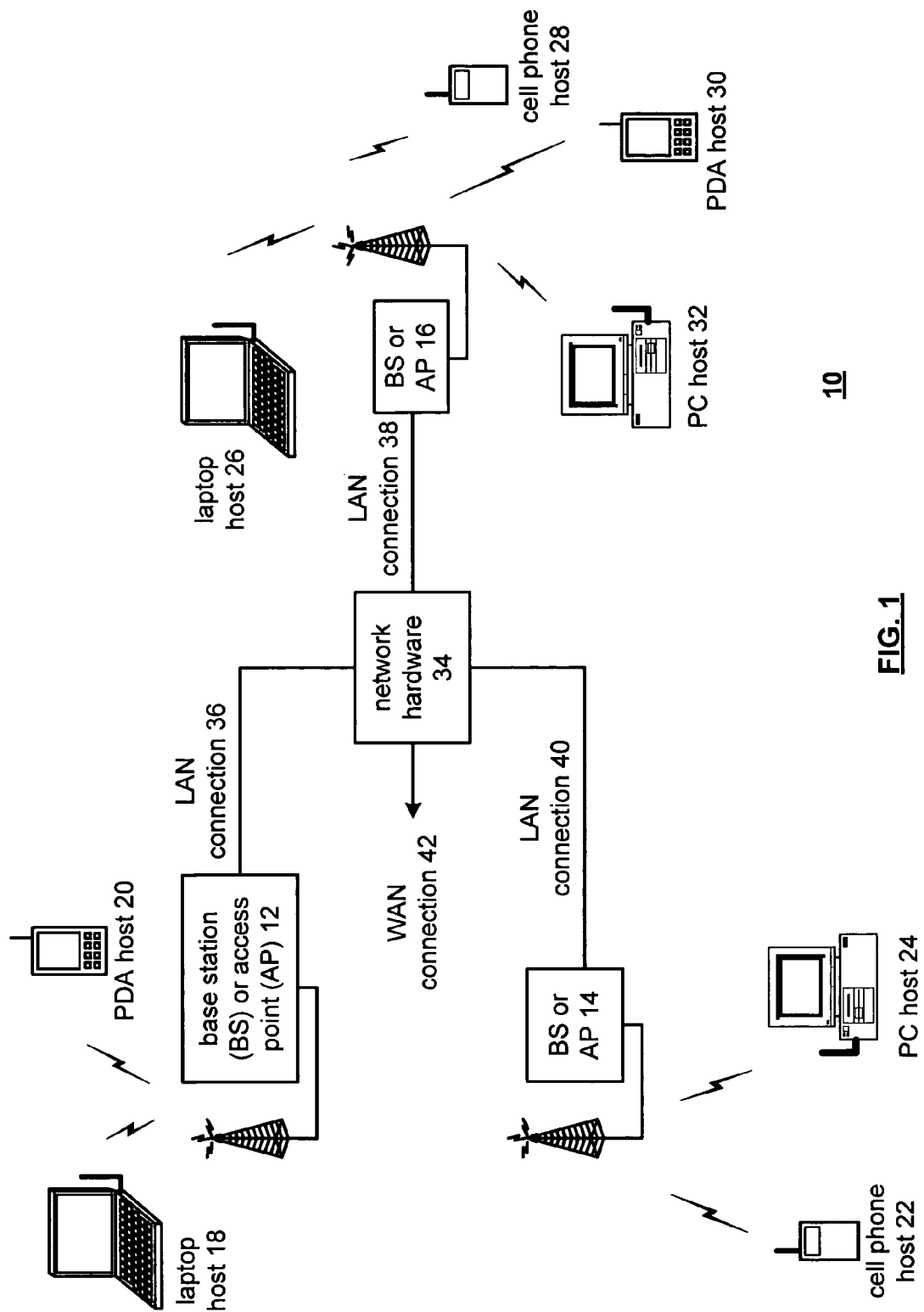
FIG. 1 is a schematic block diagram that illustrates a wireless communication system in accordance with the present invention.

FIG. 1 is a schematic block diagram of a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
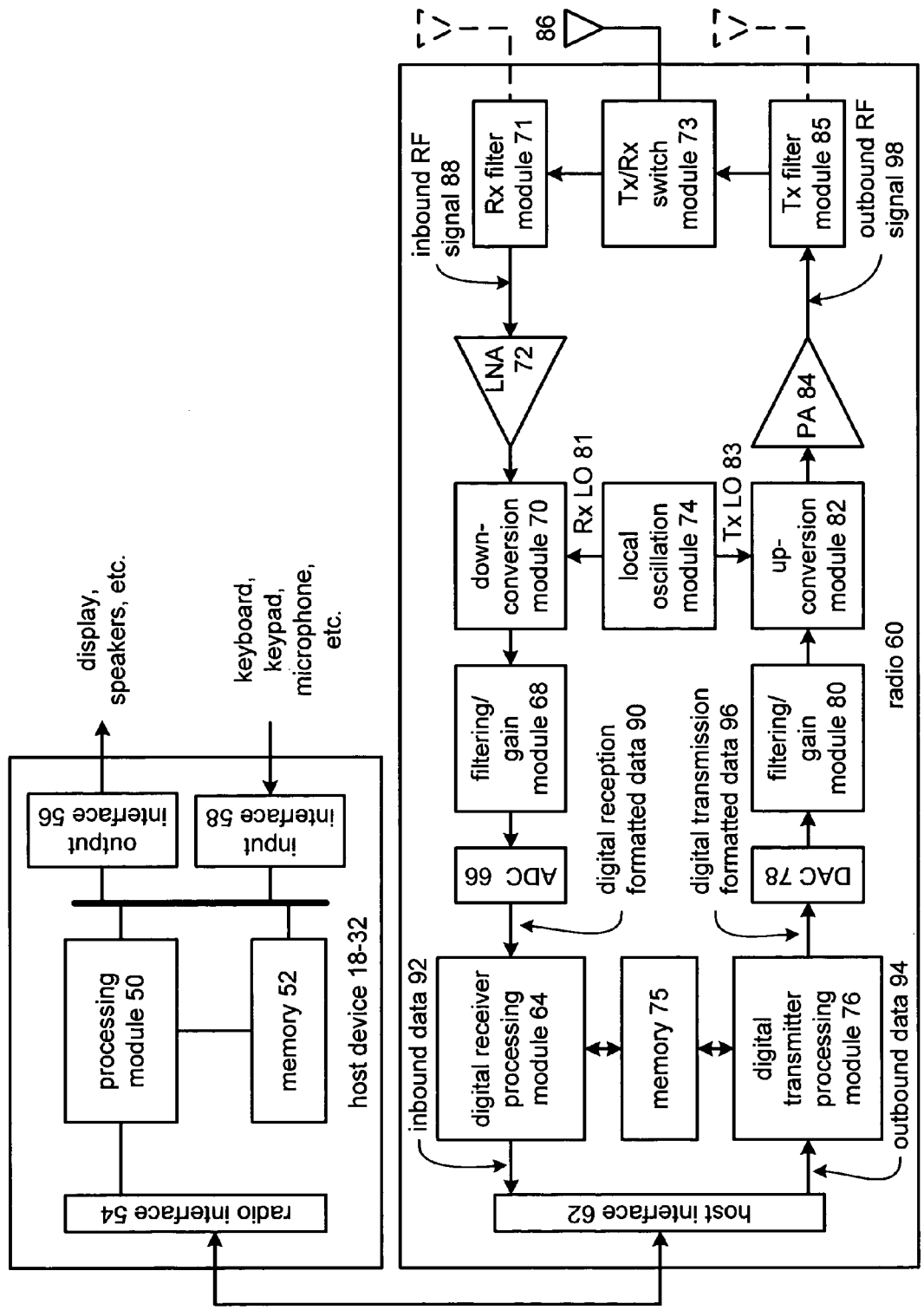
FIG. 2 is a schematic block diagram that illustrates a wireless communication device in accordance with the present invention.

FIG. 2 illustrates a schematic block diagram of a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, a single analog-to-digital converter 66, a complex bandpass filter 68, IF mixing stage 70, a receiver filter 71, a low noise amplifier 72, a transmitter filter 73, local oscillation module 74, memory 75, digital transmitter processing module 76, a transmitter/receiver switch 77, digital-to-analog converter 78, filtering/gain module 80, IF mixing stage 82, power amplifier 84, and an antenna 86. The antenna 86 may be a single antenna that is shared by the transmit and receive paths as regulated by the Tx/Rx switch 77, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE802.11a, IEEE802.11b, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84, which may be implemented in accordance with the teachings of the present invention, amplifies the RF signal to produce outbound RF signal 98, which is filtered by the Tx filter 73. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the Rx filter 71 via the Tx/Rx switch 77, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provide the amplified inbound RF signal to the IF mixing module 70, which directly converts the amplified inbound RF signal into an inbound low IF signal based on a receiver local oscillation 81 provided by local oscillation module 74. The down conversion module 70 provides the inbound low IF signal to the filter module 68, which filters them. The filter module 68 filters provides the filtered inbound low IF signals to the analog to digital converter 66, which converts them into digital reception formatted data 90.

The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18–32 via the radio interface 54.

Figure 3:
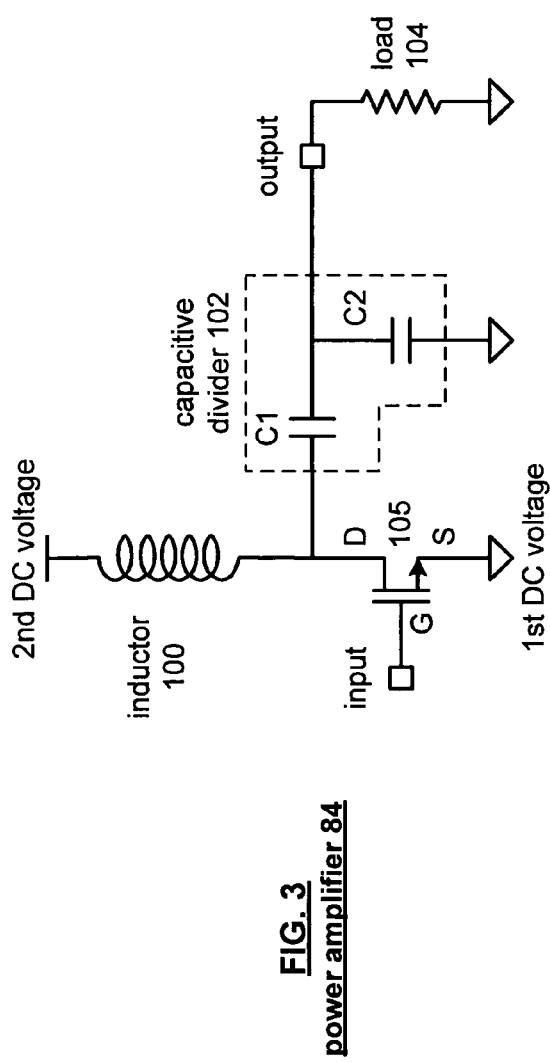
FIG. 3 is a schematic of a single-ended impedance matching power amplifier in accordance with the present invention.

FIG. 3 is a schematic of one embodiment of an on-chip impedance matching power amplifier that may be used as the power amplifier 84 of the transmitter section of radio 60. The impedance matching power amplifier 84 includes an inductor 100, a capacitive divider 102, and at least one transistor 105. The capacitive divider 102 includes a first capacitor (C1) and a second capacitor (C2), wherein C1 is placed in series between a drain of the transistor 105 and a load 104 (e.g., the antenna 86) and C2 is coupled in parallel with the load 104. The inductor 100 is coupled to the drain of the transistor 105 and to a second DC voltage potential (e.g., $V_{DD}$). The source of the transistor 105 is coupled to a first DC voltage potential (e.g., $V_{SS}$, ground, or AC ground). The loss of on-chip inductor 100 is absorbed and used as one termination of the impedance matching. Since the capacitors are essentially lossless, no power is dissipated through the impedance matching circuit of the inductor 100 and the capacitive divider 102.

The inductor 100 and the capacitive divider 102 further function to provide a tank circuit for the power amplifier 84. With such a configuration, the impedance matching power amplifier 84 is relatively insensitive to parasitic capacitance since they can be readily absorbed by the series capacitance (C1) of the capacitive divider 102 and/or the shunt capacitor (C2) of the capacitive divider 102. As one of average skill in the art will appreciate, the at least one transistor 105 may include cascoded transistors to increase isolation, may include parallel transistor configurations, and/or a combination thereof. As one of average skill in the art will further appreciate, the transistor(s) illustrated in each of the remaining figures may have similar alternate configurations.

Figure 4:
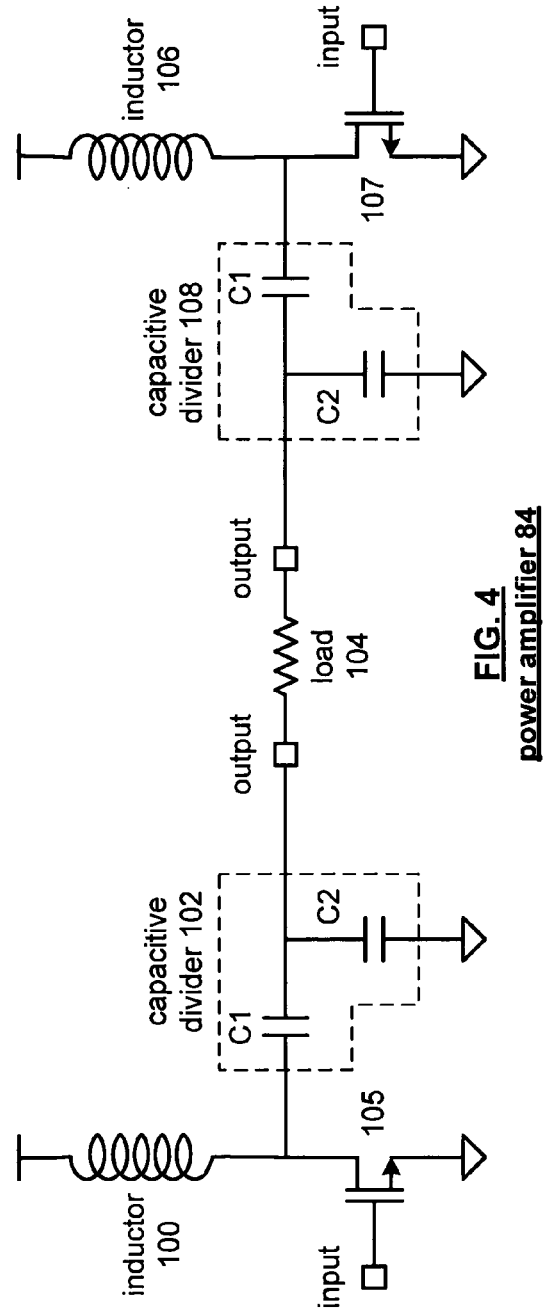
FIG. 4 is a schematic of a differential impedance matching power amplifier in accordance with the present invention.

FIG. 4 is a schematic block diagram of a differential impedance matching power amplifier 84. This implementation includes the single-ended impedance matching power amplifier of FIG. 3 and a mirrored amplifier portion. The mirrored amplifier portion includes an inductor 106, a capacitive divider 108, and a transistor 107, which operate in a similar fashion as inductor 100, capacitive divider 102, and transistor 105. The parallel combination of the inductors 100 and 105 and capacitive dividers 102 and 108 provide the impedance matching for the load 104. As such, the differential impedance matching power amplifier 84 of FIG. 4 provides substantially lossless impedance matching by using the inductors and capacitors of the capacitive dividers as both elements of the impedance matching circuit and as the tank circuit for the power amplifier.

Figure 5:
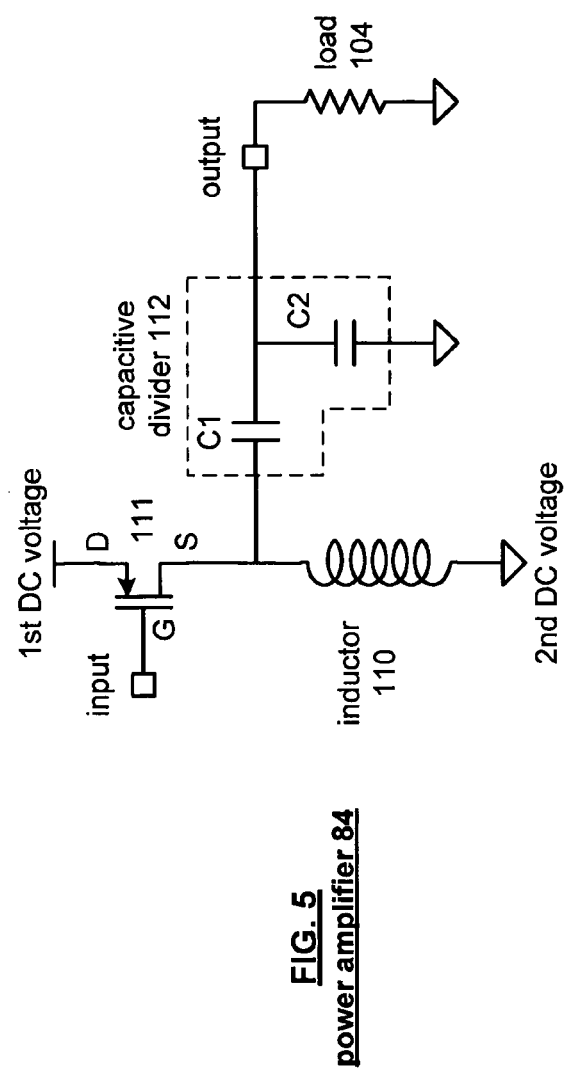
FIG. 5 is a schematic of an alternate embodiment of a single-ended impedance matching power amplifier in accordance with the present invention.

FIG. 5 is a schematic of one embodiment of an on-chip impedance matching power amplifier that may be used as the power amplifier 84 of the transmitter section of radio 60. The impedance matching power amplifier 84 includes an inductor 110, a capacitive divider 112, and a transistor 111. The capacitive divider 112 includes a first capacitor (C1) and a second capacitor (C2), wherein C1 is placed in series between a source of the transistor 111 and a load 104 (e.g., the antenna 86), and C2 is coupled in parallel with the load 104. The inductor 110 is coupled to the source of the transistor 111 and to a second DC voltage potential (e.g., $V_{SS}$, ground, or AC ground). The drain of the transistor 105 is coupled to a first DC voltage potential (e.g., $V_{DD}$). The loss of on-chip inductor 110 is absorbed and used as one termination of the impedance matching. Since the capacitors are essentially lossless, no power is dissipated through the impedance matching circuit of the inductor 110 and the capacitive divider 112.

The inductor 110 and the capacitive divider 112 further function to provide a tank circuit for the power amplifier 84. With such a configuration, the impedance matching power amplifier 84 is relatively insensitive to parasitic capacitance since they can be readily absorbed by the series capacitance (C1) of the capacitive divider 112 and/or the shunt capacitor (C2) of the capacitive divider 112.

Figure 6:
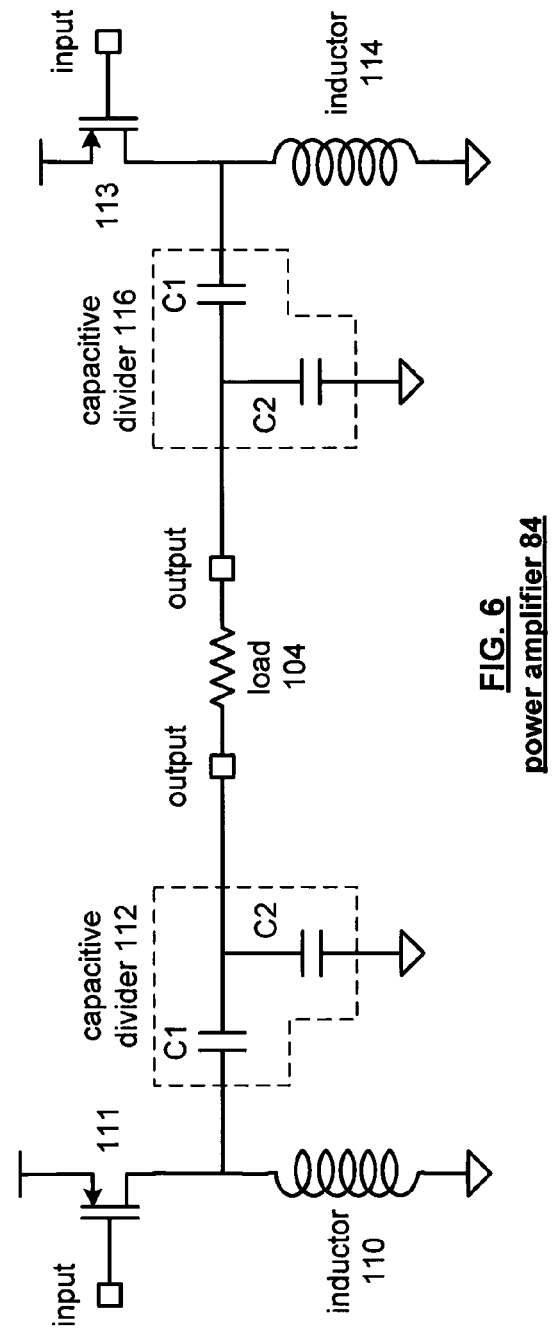
FIG. 6 is a schematic of an alternate embodiment of a differential impedance matching power amplifier in accordance with the present invention.

FIG. 6 is a schematic block diagram of a differential impedance matching power amplifier 84. This implementation includes the single-ended impedance matching power amplifier of FIG. 5 and a mirrored amplifier portion. The mirrored amplifier portion includes an inductor 114, a capacitive divider 116, and a transistor 113, which operate in a similar fashion as inductor 110, capacitive divider 112, and transistor 111. The parallel combination of the inductors 110 and 114 and capacitive dividers 112 and 116 provide the impedance matching for the load 104. As such, the differential impedance matching power amplifier 84 of FIG. 6 provides substantially lossless impedance matching by using the inductors and capacitors of the capacitive dividers as both elements of the impedance matching circuit and as the tank circuit for the power amplifier.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The preceding discussion has presented an on-chip impedance matching power amplifier that provides substantially lossless power matching of a load, such as an antenna. As one of average skill in the art will appreciate, other embodiments may be derived from the teachings of the present invention without deviating from the scope of the claims. For example, parasitic inductance and/or capacitance of an integrated circuit, of the integrated circuit packaging, and/or of a printed circuit board on which the integrated circuit is mounted may be used in conjunction with the on-chip inductor and/or capacitive divider to provide the matching characteristics of the impedance matching power amplifier. As a further example, additional inductors and/or capacitors may be coupled to the tap of the capacitive divider to further fine tune the response of the impedance matching power amplifier.

What is claimed is:

1. An on-chip impedance matching power amplifier comprises:
    an on-chip transistor operably coupled to receive an input signal; and
    an on-chip tank circuit operably coupled to the transistor, wherein a node of the on-chip tank circuit provides an output of the on-chip impedance matching power amplifier, wherein the on-chip tank circuit is tuned with respect to an antenna load of the on-chip impedance matching power amplifier;
    second transistor operably coupled to receive one leg of the input signal; and
    a second tank circuit operably coupled to the second transistor, wherein a node of the second tank circuit provides one leg of the output of the on-chip impedance matching power amplifier, wherein the second tank circuit is tuned with respect to the antenna load of the on-chip impedance matching power amplifier.

2. The on-chip impedance matching power amplifier of claim 1, wherein the on-chip tank circuit comprises:
    an inductor having an impedance loss sized to provide one termination of the on-chip impedance matching power amplifier.

3. The on-chip impedance matching power amplifier of claim 1, wherein the on-chip tank circuit comprises:
    a first capacitor coupled to the on-chip transistor; and
    a second capacitor coupled in parallel with the antenna load and to the first capacitor.

4. A differential on-chip impedance matching power amplifier comprises:
    on-chip transistors operably coupled to receive, a differential input signal; and
    an on-chip differential tank circuit operably coupled to the on-chip transistors and to an antenna load, wherein the on-chip differential tank circuit is tuned with respect to the antenna load, and where a first node of the on-chip differential tank circuit is coupled to one node of the antenna load and a second node of the on-chip differential tank circuit is coupled a second node of the antenna load.

5. The on-chip impedance matching power amplifier of claim 4, wherein the on-chip differential tank circuit comprises:
    inductors, each inductor including an impedance loss sized to provide one termination of the on-chip impedance matching power amplifier.

6. (previously amended) The on-chip impedance matching power amplifier of claim 4, wherein the on-chip differential tank circuit comprises:
    capacitive dividers, each capacitor divider including:
    a first capacitor coupled to one of the on-chip transistors; and
    a second capacitor coupled in parallel with the antenna load and to the first capacitor.

* * * * *